(12) United States Patent
Ficker et al.

(10) Patent No.: US 7,847,695 B2
(45) Date of Patent: Dec. 7, 2010

(54) EXTERNAL PACKAGE CAPABLE OF BEING RADIO-TAGGED

(75) Inventors: Jurgen Ficker, Erlangen (DE); Markus Lorenz, Haibach (DE); Wolfgang Clemens, Puschendorf (DE); Markus Bohm, Uttenreuth (DE)

(73) Assignee: PolyIC GmbH & Co. KG, Furth (DE)

( * ) Notice: Subject to any disclaimer, the term of this patent is extended or adjusted under 35 U.S.C. 154(b) by 400 days.

(21) Appl. No.: 11/574,139

(22) PCT Filed: Aug. 19, 2005

(86) PCT No.: PCT/DE2005/001468

§ 371 (c)(1),
(2), (4) Date: Aug. 29, 2007

(87) PCT Pub. No.: WO2006/021193

PCT Pub. Date: Mar. 2, 2006

(65) Prior Publication Data

US 2008/0061986 A1    Mar. 13, 2008

(30) Foreign Application Priority Data

Aug. 23, 2004   (DE) .................... 10 2004 040 831

(51) Int. Cl.
G08B 13/14 (2006.01)
(52) U.S. Cl. .................. 340/572.1; 340/572.7
(58) Field of Classification Search .............. 340/572.1, 340/572.7
See application file for complete search history.

(56) References Cited

U.S. PATENT DOCUMENTS

| | | |
|---|---|---|
| 3,512,052 A | 5/1970 | MacIver et al. |
| 3,769,096 A | 10/1973 | Ashkin |
| 3,955,098 A | 5/1976 | Kawamoto |
| 3,999,122 A | 12/1976 | Winstel et al. |
| 4,246,298 A | 1/1981 | Guarnery |
| 4,302,648 A | 11/1981 | Sado et al. |
| 4,340,057 A | 7/1982 | Bloch |
| 4,442,019 A | 4/1984 | Marks |
| 4,554,229 A | 11/1985 | Small |
| 4,865,197 A | 9/1989 | Craig |

(Continued)

FOREIGN PATENT DOCUMENTS

CN    1482705 A    3/2004

(Continued)

OTHER PUBLICATIONS

Finkenzeller, Klaus, "RFID Handbook", Second Edition, Hauser Verlag Munchen, 2000, ISBN 3-446-21278-7 (relevant pages).

(Continued)

*Primary Examiner*—Daniel Wu
*Assistant Examiner*—Naomi Small
(74) *Attorney, Agent, or Firm*—Carella, Byrne et al.; Elliot M. Olstein; William Squire (57) ABSTRACT

The invention relates to an external package, particularly one with a conductive coating and in whose surroundings an RFID tag is used. The conductive area of the electrically conductive layer is interrupted by a structure.

12 Claims, 7 Drawing Sheets

U.S. PATENT DOCUMENTS

| | | | |
|---|---|---|---|
| 4,926,052 A | 5/1990 | Hatayama | |
| 4,937,119 A | 6/1990 | Nickles et al. | |
| 5,075,816 A | 12/1991 | Stormbom | |
| 5,173,835 A | 12/1992 | Cornett et al. | |
| 5,206,525 A | 4/1993 | Yamamoto et al. | |
| 5,259,926 A | 11/1993 | Kuwabara et al. | |
| 5,321,240 A | 6/1994 | Takahira | |
| 5,347,144 A | 9/1994 | Garnier et al. | |
| 5,364,735 A | 11/1994 | Akamatsu | |
| 5,395,504 A | 3/1995 | Saurer et al. | |
| 5,480,839 A | 1/1996 | Ezawa et al. | |
| 5,486,851 A | 1/1996 | Gehner et al. | |
| 5,502,396 A | 3/1996 | Desarzens | |
| 5,528,222 A | 6/1996 | Moskowitz | |
| 5,546,889 A | 8/1996 | Wakita et al. | |
| 5,569,879 A | 10/1996 | Gloton | |
| 5,574,291 A | 11/1996 | Dodabalapur et al. | |
| 5,578,513 A | 11/1996 | Maegawa | |
| 5,580,794 A | 12/1996 | Allen | |
| 5,625,199 A | 4/1997 | Baumbach et al. | |
| 5,629,530 A | 5/1997 | Brown et al. | |
| 5,630,986 A | 5/1997 | Charlton | |
| 5,652,645 A | 7/1997 | Jain | |
| 5,691,089 A | 11/1997 | Smayling | |
| 5,693,956 A | 12/1997 | Shi | |
| 5,705,826 A | 1/1998 | Aratani et al. | |
| 5,729,428 A | 3/1998 | Sakata et al. | |
| 5,854,139 A | 12/1998 | Aratani et al. | |
| 5,858,500 A * | 1/1999 | MacPherson | 428/68 |
| 5,869,972 A | 2/1999 | Birch et al. | |
| 5,883,397 A | 3/1999 | Isoda et al. | |
| 5,892,244 A | 4/1999 | Tanaka et al. | |
| 5,946,551 A | 8/1999 | Dimitrakopoulos | |
| 5,967,048 A | 10/1999 | Fromson et al. | |
| 5,970,318 A | 10/1999 | Choi et al. | |
| 5,973,598 A | 10/1999 | Beigel | |
| 5,994,773 A | 11/1999 | Hirakawa | |
| 5,997,817 A | 12/1999 | Crismore et al. | |
| 5,998,805 A | 12/1999 | Shi et al. | |
| 6,036,919 A | 3/2000 | Thym et al. | |
| 6,045,977 A | 4/2000 | Chandross et al. | |
| 6,060,338 A | 5/2000 | Tanaka et al. | |
| 6,072,716 A | 6/2000 | Jacobsen et al. | |
| 6,083,104 A | 7/2000 | Choi | |
| 6,087,196 A | 7/2000 | Sturm et al. | |
| 6,107,920 A | 8/2000 | Eberhardt et al. | |
| 6,133,835 A | 10/2000 | DeLeeuw et al. | |
| 6,150,668 A | 11/2000 | Bao | |
| 6,162,550 A * | 12/2000 | Pinchen et al. | 428/624 |
| 6,180,956 B1 | 1/2001 | Chondroudis | |
| 6,197,663 B1 | 3/2001 | Chandross | |
| 6,207,472 B1 | 3/2001 | Calligari et al. | |
| 6,215,130 B1 | 4/2001 | Dodabalapur | |
| 6,221,553 B1 | 4/2001 | Wolk | |
| 6,249,227 B1 * | 6/2001 | Brady et al. | 340/572.1 |
| 6,251,513 B1 | 6/2001 | Rector | |
| 6,284,562 B1 | 9/2001 | Batlogg et al. | |
| 6,291,126 B2 | 9/2001 | Wolk et al. | |
| 6,300,141 B1 | 10/2001 | Segal et al. | |
| 6,321,571 B1 | 11/2001 | Themont et al. | |
| 6,322,736 B1 | 11/2001 | Bao | |
| 6,329,226 B1 | 12/2001 | Jones | |
| 6,330,464 B1 | 12/2001 | Colvin | |
| 6,335,539 B1 | 1/2002 | Dimitrakopoulos et al. | |
| 6,336,017 B1 | 1/2002 | Miyamoto et al. | |
| 6,340,822 B1 | 1/2002 | Brown et al. | |
| 6,344,662 B1 | 2/2002 | Dimitrakopoulos et al. | |
| 6,362,509 B1 | 3/2002 | Hart | |
| 6,384,804 B1 | 5/2002 | Dodabalapur et al. | |
| 6,403,396 B1 | 6/2002 | Gudesen et al. | |
| 6,429,450 B1 | 8/2002 | Mutsaers et al. | |
| 6,483,473 B1 * | 11/2002 | King et al. | 343/767 |
| 6,498,114 B1 | 12/2002 | Amundson et al. | |
| 6,517,995 B1 | 2/2003 | Jacobson et al. | |
| 6,518,949 B2 | 2/2003 | Drazic | |
| 6,521,109 B1 | 2/2003 | Bartic et al. | |
| 6,548,875 B2 | 4/2003 | Nishiyama | |
| 6,555,840 B1 | 4/2003 | Hudson | |
| 6,593,690 B1 | 7/2003 | McCormick | |
| 6,603,139 B1 | 8/2003 | Tessler | |
| 6,621,098 B1 | 9/2003 | Jackson | |
| 6,834,251 B1 * | 12/2004 | Fletcher | 702/150 |
| 6,852,583 B2 | 2/2005 | Bernds et al. | |
| 6,888,509 B2 * | 5/2005 | Atherton | 343/718 |
| 6,903,958 B2 | 6/2005 | Bernds et al. | |
| 6,960,489 B2 | 11/2005 | Bernds et al. | |
| 2001/0026187 A1 | 10/2001 | Oku | |
| 2001/0046081 A1 | 11/2001 | Hayashi et al. | |
| 2002/0018911 A1 | 2/2002 | Bernius et al. | |
| 2002/0021218 A1 * | 2/2002 | Qiu et al. | 340/572.1 |
| 2002/0022284 A1 | 2/2002 | Heeger | |
| 2002/0025391 A1 | 2/2002 | Angelopoulos | |
| 2002/0053320 A1 | 5/2002 | Duthaler | |
| 2002/0056839 A1 | 5/2002 | Joo et al. | |
| 2002/0068392 A1 | 6/2002 | Lee et al. | |
| 2002/0130042 A1 | 9/2002 | Moerman et al. | |
| 2002/0160786 A1 * | 10/2002 | Rietzler et al. | 455/455 |
| 2002/0170897 A1 | 11/2002 | Hall | |
| 2002/0195644 A1 | 12/2002 | Dodabalapur et al. | |
| 2003/0059987 A1 | 3/2003 | Sirringhaus et al. | |
| 2003/0070070 A1 | 4/2003 | Hung | |
| 2003/0112576 A1 | 6/2003 | Brewer et al. | |
| 2003/0141807 A1 | 7/2003 | Kawase | |
| 2003/0178620 A1 | 9/2003 | Bernds et al. | |
| 2004/0002176 A1 | 1/2004 | Xu | |
| 2004/0005418 A1 | 1/2004 | Schmid et al. | |
| 2004/0013982 A1 | 1/2004 | Jacobson et al. | |
| 2004/0026689 A1 | 2/2004 | Bernds et al. | |
| 2004/0074974 A1 | 4/2004 | Senba et al. | |
| 2004/0084670 A1 | 5/2004 | Tripsas et al. | |
| 2004/0211329 A1 | 10/2004 | Funahata et al. | |
| 2004/0233065 A1 | 11/2004 | Freeman | |
| 2004/0256467 A1 | 12/2004 | Clemens et al. | |

FOREIGN PATENT DOCUMENTS

| | | |
|---|---|---|
| DE | 2102735 | 8/1972 |
| DE | 33 38 597 | 5/1985 |
| DE | 41 03 675 | 8/1992 |
| DE | 692 32 740 T2 | 4/1993 |
| DE | 42 43 832 | 6/1994 |
| DE | 43 12 766 | 10/1994 |
| DE | 4401089 A1 | 7/1995 |
| DE | 19610284 A1 | 8/1996 |
| DE | 196 29 291 | 1/1997 |
| DE | 195 06 907 | 9/1998 |
| DE | 198 52 312 | 5/1999 |
| DE | 198 16 860 | 11/1999 |
| DE | 199 18 193 | 11/1999 |
| DE | 198 51 703 | 5/2000 |
| DE | 100 06 257 | 9/2000 |
| DE | 199 21 024 | 11/2000 |
| DE | 199 33 757 | 1/2001 |
| DE | 695 19 782 | 1/2001 |
| DE | 199 35 527 | 2/2001 |
| DE | 199 37 262 | 3/2001 |
| DE | 100 12 204 | 9/2001 |
| DE | 100 33 112 | 1/2002 |
| DE | 201 11 825 | 2/2002 |
| DE | 100 43 204 | 4/2002 |
| DE | 100 45 192 | 4/2002 |
| DE | 100 47 171 | 4/2002 |
| DE | 100 58 559 | 5/2002 |
| DE | 100 61 297 | 6/2002 |

| | | | | | | |
|---|---|---|---|---|---|---|
| DE | 101 17 663 | 10/2002 | | JP | 05347422 | 12/1993 |
| DE | 101 20 687 | 10/2002 | | JP | 08197788 | 8/1995 |
| DE | 101 20 686 | 11/2002 | | JP | 09083040 | 3/1997 |
| DE | 101 51 404 | 2/2003 | | JP | 09320760 | 12/1997 |
| DE | 101 51 440 | 2/2003 | | JP | 10026934 | 1/1998 |
| DE | 101 41 440 | 3/2003 | | JP | 11238103 | 8/1999 |
| DE | 101 63 267 | 7/2003 | | JP | 2001085272 | 3/2001 |
| DE | 102 09 400 | 10/2003 | | JP | 2002183695 A | 6/2002 |
| DE | 102 19 905 | 12/2003 | | TW | 517478 B | 1/2003 |
| DE | 10229168 A1 | 1/2004 | | WO | WO 93/16491 | 8/1993 |
| DE | 103 41 962 | 4/2004 | | WO | WO 94/17556 | 8/1994 |
| DE | 699 13 745 | 10/2004 | | WO | WO 95/06240 | 3/1995 |
| EP | 0 108 650 | 5/1984 | | WO | WO 95/31831 | 11/1995 |
| EP | 0 128 529 | 12/1984 | | WO | WO 96/02924 | 2/1996 |
| EP | 0 268 370 A2 | 5/1988 | | WO | WO 96/19792 | 6/1996 |
| EP | 0 268 370 A3 | 5/1988 | | WO | WO 97/12349 | 4/1997 |
| EP | 0 350 179 | 1/1990 | | WO | WO 97/18944 | 5/1997 |
| EP | 0 418 504 | 3/1991 | | WO | WO 98/18156 | 4/1998 |
| EP | 0 442 123 | 8/1991 | | WO | WO 98/18186 | 4/1998 |
| EP | 0 460 242 | 12/1991 | | WO | WO 98/40930 | 9/1998 |
| EP | 0 501 456 A2 | 9/1992 | | WO | WO 99/07189 | 2/1999 |
| EP | 0 501 456 A3 | 9/1992 | | WO | WO 99/10929 | 3/1999 |
| EP | 0 511 807 | 11/1992 | | WO | WO 99/10939 | 3/1999 |
| EP | 0 528 662 | 2/1993 | | WO | WO 99/21233 | 4/1999 |
| EP | 0 603 939 A2 | 6/1994 | | WO | WO 99/30432 | 6/1999 |
| EP | 0 615 256 | 9/1994 | | WO | WO 99/39373 | 8/1999 |
| EP | 0 685 985 | 12/1995 | | WO | WO 99/40631 | 8/1999 |
| EP | 0 716 458 A2 | 6/1996 | | WO | WO 99/53371 | 10/1999 |
| EP | 0 716 458 A3 | 6/1996 | | WO | WO 99/54842 | 10/1999 |
| EP | 0 785 578 A2 | 7/1997 | | WO | WO 99/54936 | 10/1999 |
| EP | 0 785 578 A3 | 7/1997 | | WO | WO 99/66540 | 12/1999 |
| EP | 0 786 820 | 7/1997 | | WO | WO 00/07151 | 2/2000 |
| EP | 0 690 457 | 12/1999 | | WO | WO 00/33063 | 6/2000 |
| EP | 0 962 984 A2 | 12/1999 | | WO | WO 00/36666 | 6/2000 |
| EP | 0 962 984 A3 | 12/1999 | | WO | WO 00/79617 | 12/2000 |
| EP | 0 966 182 | 12/1999 | | WO | WO 01/03126 | 1/2001 |
| EP | 0 979 715 | 2/2000 | | WO | WO 01/06442 | 1/2001 |
| EP | 0 981 165 | 2/2000 | | WO | WO 01/08241 | 2/2001 |
| EP | 0 989 614 A2 | 3/2000 | | WO | WO 01/15233 | 3/2001 |
| EP | 1 048 912 | 11/2000 | | WO | WO 01/17029 | 3/2001 |
| EP | 1 052 594 | 11/2000 | | WO | WO 01/17041 | 3/2001 |
| EP | 1 065 725 A2 | 1/2001 | | WO | WO 01/27998 | 4/2001 |
| EP | 1 065 725 A3 | 1/2001 | | WO | WO 01/46987 | 6/2001 |
| EP | 1 083 775 | 3/2001 | | WO | WO 01/47044 A2 | 6/2001 |
| EP | 1 102 335 A2 | 5/2001 | | WO | WO 01/47044 A3 | 6/2001 |
| EP | 1 103 916 | 5/2001 | | WO | WO 01/47045 | 6/2001 |
| EP | 1 104 035 A2 | 5/2001 | | WO | WO 01/69517 | 9/2001 |
| EP | 1 113 502 | 7/2001 | | WO | WO 01/73109 A2 | 10/2001 |
| EP | 1 134 694 | 9/2001 | | WO | WO 01/73109 A3 | 10/2001 |
| EP | 1 170 851 | 1/2002 | | WO | WO 02/05360 | 1/2002 |
| EP | 1 224 999 | 7/2002 | | WO | WO 02/05361 | 1/2002 |
| EP | 1227434 | 7/2002 | | WO | WO 02/15264 | 2/2002 |
| EP | 1 237 207 | 9/2002 | | WO | WO 02/17233 | 2/2002 |
| EP | 1 296 280 | 3/2003 | | WO | WO 02/19443 | 3/2002 |
| EP | 1 318 084 | 6/2003 | | WO | WO 02/21612 | 3/2002 |
| EP | 1422168 | 5/2004 | | WO | WO 02/29912 | 4/2002 |
| FR | 2793089 | 11/2000 | | WO | WO 02/43071 | 5/2002 |
| GB | 723598 | 2/1955 | | WO | WO 02/47183 | 6/2002 |
| GB | 2 058 462 | 4/1981 | | WO | WO 02/065557 A1 | 8/2002 |
| GR | 2001P20024 | 8/2000 | | WO | WO 02/071139 | 9/2002 |
| GR | 2001P03239 | 1/2001 | | WO | WO 02/071505 | 9/2002 |
| JP | 54069392 | 6/1979 | | WO | WO 02/076924 | 10/2002 |
| JP | 60117769 | 6/1985 | | WO | WO 02/091495 A2 | 11/2002 |
| JP | 61001060 | 1/1986 | | WO | WO 02/091495 A3 | 11/2002 |
| JP | 61167854 | 7/1986 | | WO | WO 02/095805 A2 | 11/2002 |
| JP | 62065472 A | 3/1987 | | WO | WO 02/095805 A3 | 11/2002 |
| JP | 362065477 A | 3/1987 | | WO | WO 02/099907 | 12/2002 |
| JP | 63205943 | 8/1988 | | WO | WO 02/099908 | 12/2002 |
| JP | 01169942 | 7/1989 | | WO | WO 03/027948 | 4/2003 |
| JP | 2969184 | 12/1991 | | WO | WO 03/036686 | 5/2003 |
| JP | 03290976 A | 12/1991 | | WO | WO 03/038897 | 5/2003 |
| JP | 05152560 | 6/1993 | | WO | WO 03/046922 | 6/2003 |
| JP | 05259434 | 10/1993 | | WO | WO 03/057501 | 7/2003 |

| | | |
|---|---|---|
| WO | WO 03/067680 | 8/2003 |
| WO | WO 03/069552 | 8/2003 |
| WO | WO 03/081671 | 10/2003 |
| WO | WO 03/095175 | 11/2003 |
| WO | WO 2004/032257 | 4/2004 |
| WO | WO 2004/042837 A2 | 5/2004 |
| WO | WO 2004/042837 A3 | 5/2004 |
| WO | WO 2004/047144 A2 | 6/2004 |
| WO | WO 2004/047144 A3 | 6/2004 |
| WO | WO 2004/047194 A2 | 6/2004 |
| WO | WO 2004/047194 A3 | 6/2004 |
| WO | WO 2004/083859 | 9/2004 |
| WO | WO 2005/004194 | 1/2005 |

OTHER PUBLICATIONS

Harrop, Peter, "RFID in Packaging", "Pira on Printing", Pira International Copyr. 2002, ISNB 1858029457; PAELLA Project ACREO, dry phase patterning method; Antenna for EAS RFID, p. 49, fig. 6.2.
English translation of Office Action of corresponding Chinese Patent Application No. 200580034556.1.
U.S. Appl. No. 10/344,926, filed Feb. 12, 2004, Adolf Bernds et al., See Disclosure Statements filed.
U.S. Appl. No. 10/344,951, filed Feb. 12, 2004, Adolf Bernds et al.
U.S. Appl. No. 10/380,113, filed Sep. 25, 2003, Adolf Bernds et al.
U.S. Appl. No. 10/381,032, filed Feb. 12, 2004, Adolf Bernds et al.
U.S. Appl. No. 10/433,961, filed Apr. 1, 2004, Wolfgang Clemens et al.
U.S. Appl. No. 10/451,108, filed May 13, 2004, Mark Giles et al.
U.S. Appl. No. 10/473,050, filed May 20, 2004, Adolf Bernds et al.
U.S. Appl. No. 10/479,234, filed Dec. 30, 2004, Adolf Bernds et al.
U.S. Appl. No. 10/479,238, filed Oct. 20, 2004, Adolf Bernds et al.
U.S. Appl. No. 10/492, 922, filed Mar. 3, 2005, Erwann Buillet et al.
U.S. Appl. No. 10/492,923, filed Dec. 23, 2004, Wolfgang Clemens et al.
U.S. Appl. No. 10/508,737, filed May 19, 2005, Adolf Bernds et al.
U.S. Appl. No. 10/517,750, filed Oct. 13, 2005, Wolfgang Clemens et al.
U.S. Appl. No. 10/523,216, filed Feb. 2, 2006, Adolf Bernds et al.
U.S. Appl. No. 10/523,487, filed Apr. 13, 2006, Wolfgang Clemens et al.
U.S. Appl. No. 10/524,646, filed May 11, 2006, Walter Fix et al.
U.S. Appl. No. 10/533,756, filed Jun. 8, 2006, Wolfgang Clemens et al.
U.S. Appl. No. 10/534,678, filed Jun. 8, 2006, Wolfgang Clemens et al.
U.S. Appl. No. 10/535,448, filed Jun. 8, 2006, W. Clemens et al.
U.S. Appl. No. 10/535,449, filed Feb. 16, 2006, Walter Fix et al.
U.S. Appl. No. 10/344,926, filed Feb. 12, 2004, Adolf Bernds et al.
U.S. Appl. No. 10/541,815, filed Jun. 8, 2006, Axel Gerlt et al.
U.S. Appl. No. 10/541,956, Wolfgang Clemens et al.
U.S. Appl. No. 10/541,957, filed Jul. 6, 2006, Walter Fix et al.
U.S. Appl. No. 10/543,561, Wolfgang Clemens et al.
U.S. Appl. No. 10/542,678, Adolf Bernds et al.
U.S. Appl. No. 10/542,679, filed Mar. 16, 2006, Adolf Bernds et al.
U.S. Appl. No. 10/562,989, Jurgen Ficker et al.
U.S. Appl. No. 10/562,869, Wolfram Glauert.
U.S. Appl. No. 10/569,763, Walter Fix et al.
U.S. Appl. No. 10/568,730, Wolfgang Clemens et al.
U.S. Appl. No. 10/569,233, Adolf Bernds et al.
U.S. Appl. No. 10/570,571, Clemens et al.
U.S. Appl. No. 10/585,775, Walter Fix et al.
U.S. Appl. No. 11/574,139, Jurgen Ficker et al.
U.S. Appl. No. 11/721,284, Markus Bohm et al.
U.S. Appl. No. 11/721,219, Wolfgang Clemens et al.
U.S. Appl. No. 11/721,244, Robert Blache et al.
U.S. Appl. No. 11/722,457, Markus Bohm et al.
U.S. Appl. No. 11/817,258, Andreas Ullmann et al.
U.S. Appl. No. 11/817,329, Andreas Ullmann et al.
Angelopoulos M et al., "In-Situ Radiation Induced Doping", Mol. Crystl. Liq. Cryst., 1990, vol. 189, pp. 221-225.

Assadi A, et al:, Field-Effect Mobility of Poly (3-Hexylthiophene) Dept. of Physics and Measurement Technology, Received Mar. 3, 1998; accepted for Publication May 17, 1988.
Bao, Z. et al., "High-Performance Plastic Transistors Fabricatecd by Printing Techniques", Chem. Mater vol. 9, No. 6, 1997, pp. 1299-1301.
Bao, Z. et al. "Organic and Polymeric Materials for the Fabrications of Thin Film Field-Effect Transistors", paper presented at the meeting of American Chemical Society, Division of Polymer Chemistry, XX, XX, vol. 39, No. 1, Mar. 29, 1998.
Baude P F et al, "Organic semiconductor RFID transponsers" International Electron Devices Metting 2003. IEDM. Technical Digest. Washington, DC, Dec. 8-10, 2003, New York NY, IEEE, US Dec. 8, 2003, pp. 191-194.
Belloni, F. et al, "Parameters Optimization for Improved Dynamics of Voltage Multipliers for Space", 2004 $35^{th}$ Annual IEEE Electronics Specialists Conference, Aachen, Germany, 2004, pp. 439-442.
Bonse M. et al., "Integrated a-Si:H/Pentacene Inorganic Organic Complementary Circuits" in IEEE, IEDM 98, pp. 249-252.
Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.
Brabec, C.J. et al., "Photovoltaic properties of a conjugated polymer/ methanofullerene composites embedded in a polystyrene matrix", Journal of Applied Physics, vol. 85, No. 9, 1999, pp. 6866-6872.
Braun D., et al, "Visible light emission from semiconducting polymer diodes", American Institute of Physics, Applied Physics Letters 58, May 6, 1991, pp. 1982-1984.
Brown, A.R. et al., "Field-effect transistors made from solution-processed organic semiconductors", Elsevier Science, S.A., Synthetic Metals 88 (1997) pp. 37-55.
Brown, A.R., "Logic Gates Made from Polymer Transistors and Their Use in Ring Oscillators", Science, vol. 270, Nov. 10, 1995, pp. 972-974.
Chen, Shiao-Shien et al:, "Deep Submicrometer Double-Gate Fully-Depleted SOI PMOS Devices: A Concise Short-Channel Effect Threshold Voltage Model Using a Quasi-2D Approadh", IEEE Transaction on Electron Devices, vol. 43, No. 9, Sep. 1996.
Chen, X.L. et al., "Morphological and Transistor Studies of Organic Molecular Semiconductors with Anisotropic Electrical Characteristics", American Chemical Society, 2001, Chem. Mater. 2001, 13, 1341-1348.
Clemens, W. et al., "Vom Organischen Transistor Zum Plastik-Chip," Physik Journal, V. 2, 2003, pp. 31-36.
Collet J. et al:, Low Voltage, 30 NM Channel Length, Organic Transistors With a Self-Assembled Monolayer as Gate Insulating Films:, Applied Physics Letters, American Institute of Physics. New York, US, Bd 76, Nr. 14, Apr. 3, 2000, Seiten 1941-1943, XP000950589, ISSN:0003-6951, das ganze Dokument.
Cox, Robert W. et al., "A Minimally Intrusive, Low Cost System for Determining Indoor Air Flow Patterns", Computers In Power Electronics, 2004. IEEE Workshop on Urbana, IL Aug. 15-18, 2004, Piscataway, NJ, IEEE, Aug. 15, 2004, pp. 63-68.
Crone, B. et al, "Large-scale complementary Integrated circuits based on Organic transistors", Nature, vol. 403, Feb. 3, 2000, pp. 521 -.
Crone B. K. et al., "Design and Fabrication of Organic Complementary Circuits", J. Appl. Phys. vol. 89, May 2001, pp. 5125-5132.
Dai, L. et al, Photochemical Generation of Conducting Pattersn in Polybutadiene Films:, Macromolecules, vol. 29, No. 1, 1996, pp. 282-287, XP 001042019, the whole document.
Dai, L. et al., "Conjugation of Polydienes by Oxidants Other Than Iodine", Elsevier Science S.A., Synthetic Metals 86 (1997) 1893-1894.
Dai, L. et al., "$I_2$-Doping" of 1,4-Polydienes*, Elsevier Science S.A., Synthetic Metals 69 (1995), pp. 563-566.
De Leeuw C.M. et al., "Polymeric integrated circuits and light-emitting diodes", Electron Devices Meeting, 1997. Technical Digest, International, Washington, DC, USA Dec. 7-10, 1997, New York, NY, USA, IEEE, US Dec. 7, 1997.

Dodabalapur, A. et al., Organic smart pixels, American Institute of Physics, Applied Physics Letters, vol. 73, No. 2, Jul. 13, 1998, pp. 142-144.

Drury et al., "Low-Cost All-Polymer Integrated Circuits", American Institute of Physics, Applied Physics Letters, 1998, vol. 73, No. 1, pp. 108-110, Jul. 6, 1998.

Ficker, J. et al., "Dynamic and Lifetime Measurements of Polymer OFETS and Integrated Plastic Circuits," Proc. of SPIE, v. 466, 2001, pp. 95-102.

Fix, W. et al., "Fast Polymer Integrated Circuits Based on a Polyfluorene Derivative", ESSDERC 2002, 2002, pp. 527-529.

Fix, W., et al., "Fast polymer integrated circuits", American Institute of Physics, Applied Physics Letters, vol. 81, No. 89, Aug. 2002, pp. 1735-1737.

Forrest et al.: "The Dawn of Organic Electronics", IEEE Spectrum, Aug. 2000, Seiten 29-34, XP002189000, IEEE Inc., New York, US ISSN:0018-9235, Seite 33, rechte Spalte, Zeile 58-Seite 34, linke Spalte, Zeile 24; Abbildung 5.

Fraunhofer Magazin- Polytronic Chips Von der Rolle, Apr. 2001, pp. 8-13.

Garbassi F., et al., "Bulk Modifications", Polymer Surfaces, John Wiley & Sons, 1998, pp. 289-300.

Garnier F et al:, "Vertical Devices Architecture By Molding Of Organic-Based Thin Film Transistor", Applied Physics Letters, American Institute of Physics. XP000784120, issn: 0003-6951 abbildung 2.

Garnier, F. et al, "All-Polymer Field-Effect Transistor Realized by Printing Techniques", Science, American Association for the Advancement of Science, US, vol. 265, Sep. 16, 1994, pp. 1684-1686.

Garnier et al., "Conjugated Polymers and Oligomers as Active Material for Electronic Devices", Synthetic Metals, vol. 28, 1989.

Gelinck, G.H. et al., "High-Performance All-Polymer Integrated Circuits", Applied Physics Letters, v. 77, 2000, pp. 1487-1489.

Goncalves_Conto, Sylvie, et al., "Interface Morphology in Organic Light-Emitting Diodes", Advanced Materials 1999, vol. 11, No. 2, pp. 112-115.

Gosain, D.P., "Excimer laser crystallized poly-Si TFT's on plastic substrates", Second International Symposium on Laser Precision Microfabrication, May 16-18, 2001, Singapore, vol. 4426, pp. 394-400.

Halls, J.J. M., et al., "Efficient photodiodes from interpenetrating polymer networks", Nature, vol. 376, Aug. 10, 1995, pp. 498-500.

Harsanyi G. et al, "Polytronics for biogtronics:unique possibilities of polymers in biosensors and BioMEMS", IEEE Polytronic 2002 Conference, Jun. 23, 2002, pp. 211-215.

Hart, C.M. et al, "Low-cost all-polymer integrated circuits", Solid-State Circuits Conference, 1998. EXXCIRC '98 Proceedings of the 24th European, The Hague, The Netherlands Sep. 22-24, 1998, Piscataway, NJ, USA, IEEE, Sep. 22, 1998, pp. 30-34.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Hergel, H. J.: "Pld-Programmiertechnologien", Elektronik, Franzis Verlag GMBH. Munchen, DE, Bd 41, Nr. 5, Mar. 3, 1992, Seiten 44-46, XP000293121, ISSN: 0013-5658, Abbildungen 1-3.

Hwang J D et al:, "A Vertical Submicron Slc thin film transistor", Solid State Electronics, Elsevier Science Publishers, Barking, GB, Bd. 38, NR. 2, Feb. 1, 1995, Seiten 275-278, XP004014040, ISSN:0038-1101, Abbildung 2.

IBM Technical Disclosure Bulletin, "Short-Channel Field-Effect Transistor", IBM Corp., New York, US, Bd. 32, Nr. 3A, Aug. 1, 1989, Seiten 77-78, XP000049357, ISSN:0018-8689, das ganze Dokument.

Kawase, T., et al., "Inkjet Printed Via-Hole Interconnections and Resistors for All-Polymer Transistor Circuits", Advanced Materials 2001, 13, No. 21, Nov. 2, 2001, pp. 1601-1605.

Kind, D., "Einfuhrung in die Hochspannungs-Versuchstechnik", Friedrich. Vieweg & Sohn, Braunschweig/Wiesbaden, pp. 16-21.

Klauk, H. et al., "Fast Organic Thin Film Transistor Circuits", IEEE Electron Device Letters, vol. 20, No. 6, pp. 289-291.

Klauk, H. et al., "Pentacene Thin Film Transistors and Inverter Circuits", 1997 International Exectron Devices Meeting Technical Digest, pp. 539-542, Dec. 1997.

Knobloch, A. et al., "Printed Polymer Transistors", Proc. Polytronic, v. 84, 2001, pp. 84-89.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp. 265-271.

Koezuka, H. et al., "Macromolecular Electronic Device", Mol. Cryst. Liq. Cryst. 1994, vol. 2555, pp. 221-230.

Kuhlmann et al., "Terabytes in Plastikfolie", Organische Massenspeicher vor der Serienproduktion.

Kumar, Anish et al:, "Kink-Free Polycrystalline Silicon Double-Gate Elevated-Channel Thin-Film Transistors", IEEE Transactions on Electron Devices, vol. 45, No. 12, Dec. 1998.

Lidzey, D. G. et al., "Photoprocessed and Micropatterned Conjugated Polymer LEDs", Synthetic Metals, V. 82, 1996, pp. 141-148.

Lowe, J. et al., "Poly (3-(2-Acetoxyethyl)Thiophene): A Model Polymer for Acid-Catalyzed Lithography", Synthetic Metals, Elsevier Sequoia, Lausanne, CH, Bd. 85, 1997, Seiten 1427-1430.

Lu, Wen et al., "Use of Ionic Liquids for π-Conjugated Polymer Electrochemical Devices", Science, vol. 297, 2002, pp. 983-987/.

Lucent Technologies, "Innovation marks significant milestone in the development of electronic paper", Cambridge, MA and Murray Hill, NJ, Nov. 20, 2000. XP-002209726.

Manuelli, Alessandro et al., "Applicability of Coating Techniques for the Production of Organic Field Effect Transistors", IEEE Polytronic 2002 Conference, 2002, pp. 201-204.

Marko, H., Vorlesungsmanuskript "Nachrichtentechnik 2 (Modulationsverfahren" des Lehrstuhls fur Nachrichtentechnik der Technischen Universitat Munchen, 1989.

Miyamoto, Shoichi et al:, Effect of LDD Structure and Channel Poly-Si Thinning on a Gate-All-Around TFT (GAT) for SRAM's, IEEE Transactions on Electron Devices. vol. 46, No. 8, Aug. 1999.

Nalwa, H.S., "Organic Conductive Molecules and Polymers", vol. 2, 1997, pp. 534-535.

"Nachrichtentechnik 2 (Modulationsverfahren)" des Lehrstuhls fur Nachrichtentechnik der Technischen Universitat Munchen, 1989.

Oelkrug, D. et al., "Electronic spectra of self-organized oligothiophene films with 'standing' and 'lying' molecular units", Elsevier Science S.A., 1996, Thin Solid Films 284-270.

Qiao, X. et al., "The FeCI3-doped poly3-alkithiophenes) in solid state", Elsevier Science, Synthetic Metals 122 (2001) pp. 449-454.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Rogers J A et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN: 003-6951, das ganze Dokument.

Rogers, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Roman et al., "Polymer Diodes With High Rectification", Applied Physics Letters, vol. 75, No. 21, Nov. 22, 1999.

Rost, Henning et al., "All-Polymer Organic Field Effect Transistors", Proc. Mat. Week, CD, 2001, pp. 1-6.

Sandberg, H. et al, "Ultra-thin Organic Films for Field Effect Transistors", SPIE vol. 4466, 2001, pp. 35-43.

Schoebel, "Frequency Conversion with Organic-On-Inorganic Heterostructured Diodes", Extended Abstracts of the International Conference on Solid State Devices and Materials, Sep. 1, 1997.

Schrodner M. et al., "Plastic electronics based on Semiconducting Polymers", First International IEEE Conference on Polymers and Adhesives in Microelectronics and Photonics. Incorporating Poly, Pep & Adhesives in Electronics. Proceedings (Cat. No. 01TH8592), First International IEEE Conference on Polymers and Adhesives in Micr, Seitenn 91-94.

Shaheen, S.E., et al., "Low band-gap polymeric photovoltaic devices", Synthetic Metals, vol. 121, 2001, pp. 1583-1584.

Speakman, S.P. et al., High performance organic semiconducting thin films: Ink Jet printed polythophene [rr-P3HT], Organic Electronics 2 (2), 2001, pp. 65-73.

Takashima, W. et al., Electroplasticity Memory Devices Using Conducting Polymers and Solid Polymer Electrolytes, Polymer International, Melbourne, 1992, pp. 249-253.

Ullman, A. et al., "High Performance Organic Field-Effect Transistors and Integrated Inverters", Mat. Res. Soc. Symp. Proc., v. 665, 2001, pp. 265-270.

Velu, G. et al. "Low Driving Voltages and Memory Effect in Organic Thin-Film Transistors With A Ferroelectric Gate Insulator", Applied Physics Letters, American Institute of Physics, New York, vo.1 79, No. 5, 2001, pp. 659-661.

Wang, Hsing et al., "Conducting Polymer Blends: Polythiophene and Polypyrrole Blends with Polystyrene and Poly(bisphenol A carbonate)", Macromolecules, 1990, vol. 23, pp. 1053-1059.

Wang, Yading et al., "Electrically Conductive Semiinterpenetrating Polymer Networks of Poly(3-octylthiophene)", Macromolecules 1992, vol. 25, pp. 3284-3290.

Yu, G. et al., "Dual-function semiconducting polymer devices: Light-emitting and photodetecting diodes", American Institute of Physics, Applied Physics Letter 64, Mar. 21, 1994, pp. 1540-1542.

Zangara L., "Metall Statt Halbleiter, Programmierung Von Embedded ROMS Ueber Die Metallisierungen", Elektronik, Franzis Verlag GmbH, Munchen, DE, vol. 47, No. 16, Aug. 4, 1998, pp. 52-55.

Zheng, Xiang-Yang et al., "Electrochemical Patterning of the Surface of Insulators with Electrically Conductive Polymers", J. Electrochem. Soc., v. 142, 1995, pp. L226-L227.

Zie Voor Titel Boek, d 2e Pagina,XP-002189001, p. 196-228.

* cited by examiner

EXTERNAL PACKAGE CAPABLE OF BEING RADIO-TAGGED

The invention relates to an external package, particularly one enclosing a product with a radio tag, such as an RFID (Radio Frequency IDentification) tag, and/or in whose proximity there is such a tag.

Groceries, cigarettes, tobacco in general, chewing gum, chocolates and much more are typically packaged in foils which keep the content fresh. The foils are often made of paper or another support (such as a polymer film) onto which a thin electrically conductive layer, normally a metal layer, typically aluminum, has been put. In this case, the thin metal layer has quite a few effects; among other things it has a shiny appearance, forms a barrier layer for oxygen and moisture, reflects the radiation of heat and has a correspondingly insulating character.

A drawback of this external package with an electrically conductive layer when using RFID tags, particularly EPC (Electronic Product Code) tags and EAS (Electronic Article Surveillance) tags, as is currently being planned on a grand scale, is that the electrically conductive layer of the external package produces an electrically conductive area which shields electromagnetic waves undesirably, in similar fashion to in what is known as a Faraday cage, or reflects them and hence makes it difficult or even impossible to use radio tags and/or miscellaneous electric components on the product and/or on the external package.

It is therefore an object of the present invention to provide an external package having a support and an electrically conductive layer which does not prevent the use of tags in the surroundings of the external package.

This object is achieved by the subject matter of the independent and dependent claims, the description and the figures.

The invention relates to an external package for a product having an electric component, comprising at least one support and an electrically conductive layer, where the electrically conductive layer has a structure and/or a coating which reduces the shielding produced by its conductive area in the surroundings of the external package such that the use of an electric component which delivers or receives information externally through the external package and/or whose power supply is fed through the external package is not adversely affected or is adversely affected only to an extent such that the component is still operable.

In this context, the term "in the surroundings" covers the following:

Firstly a tag which is arranged directly on the product and/or within the external package.

Secondly a tag which is in proximity to the external package.

The shielding by the external package means that disturbances in the case of conventional tags within and/or directly on the external packages and also in the case of tags which are outside the external package, but in proximity thereto, normally arise as a result of the electromagnetic waves being reflected by the metal, for example. In this context, the term "in the surroundings" or "close" means "in the region of the typical reading range of the tags", for example typically up to approximately 70 cm at 13.56 MHz, and in the case of UHF (Ultra High Frequency ~850-950 MHz) this may be up to approximately 2 m, and in the GHz range even more still (several meters).

The term "that the component is still operable" means the shielding which is still tolerable and may not indicate a specific value, since this is dependent on many factors such as transmission power, transmission frequency and/or the type of component, such as the type of radio tag. Shielding which is no longer tolerable is a reduction in the reading distance by half (e.g. from 70 cm to 35 cm), for example, and/or exists when any information is shielded down to below the noise limit and/or the power supply for a radio frequency tag is reduced to below the minimum operating voltage.

A shielding-reducing coating for the conductive layer of the external package may be used as an alternative to the structure and/or in addition to it and preferably has a high electrical impedance (e.g. >10^5 Ohm m) or is insulating.

By way of example, the visually metallic effect can be achieved merely by very thin metal layers (of a few 10 nm, which have very poor electrical conductivity on account of the small layer thickness and/or because they have a very high level of interrupt-on owing to their production process, e.g. vapor deposition, sputtering), which can then be brought into line with the further requirements of the external package using various lacquer layers.

It is equally possible to put an image on the external package, possibly even over the structure.

The structure in the conductive layer changes the shielding and/or reflection effects such that induced, shielding and/or reflecting currents in the conductive layer (e.g. as a result of eddy currents) are reduced or even prevented. As a result, the electromagnetic radiation then penetrates the external package and/or it is possible for coupling, particularly inductive, capacitive, near-field or far-field coupling, to take place. It is then possible to transmit electric power and/or information in the surroundings of the external package, even in the region of the transmission powers of RFID tags.

The transmission powers are usually stipulated by laws. An overview of the transmission powers which can be used for RFID applications is given in (Klaus Finkenzeller, "RFID-Handbuch" [RFID manual], 2nd edition, Hauser Verlag Munich, 2000, ISBN 3-446-21278-7), for example. Accordingly, the limit value for the carrier power for 13.56 MHz applications in Germany is 68.5 dBµA at a distance of 3 m and 13.5 dBµA at a distance of 30 m from the transmitter, with the magnetic H field for the radio installation being measured. The power limits vary for different frequencies and for different countries.

The structure interrupts the electrically conductive area of the electrically conductive layer once or a plurality of times, with the interruption preferably dividing at least the area above a coil of the electric component, for example, into two halves, for example. The structure disturbs the shielding most effectively when it is arranged opposite and in the center of a coil of the electric component.

By way of example, the structure is a simple recess which completely or partly passes through the conductive area of the electrically conductive layer. The shape of the recesses is irrelevant, only the size and shape of the remaining conductive regions is important, which need to be designed such that eddy currents are prevented.

The structure divides the conductive area of the electrically conductive layer into at least two smaller conductive areas. The structure can also divide the conductive area of the electrically conductive layer into many small conductive areas, however. By way of example, the structure comprises at least two parallel and/or at least two nonparallel recesses. In this case, what is important is not the shape of the recesses but rather the size and shape of the remaining conductive area (with the same area, for example, an open circle has hardly any effect but a closed circle has a very pronounced shielding effect), and at a given frequency a smaller area produces little shielding but a larger scale produces greater shielding.

The external package can be produced by putting an electrically conductive layer onto a support, for example paper or foil, and then patterning it in a subsequent work step. The structure is preferably made using simple means and/or minimal actions.

By way of example, what is known as dry phase patterning is particularly advantageous (for example see the publication by Pira International Copyr. 2002, "RFID in Packaging", Dr. Peter Harrp, "Pira on printing", ISBN 1858029457; PAELLA Project ACREO, dry phase patterning method; Antenna for EAS RFID p. 49 fig. 6.2), since this uses no wet-chemical methods. Advantageously, the conductive layer of the external package is patterned in large volumes and/or inexpensively by a dry patterning method, for example using a patterned scratching method (which is also suitable for roll-to-roll).

It is naturally also possible to use any other patterning direct or indirect, additive or subtractive methods, however, depending on the type of external package (e.g. patterned vapor deposition, printing with a protective Lacquer and a subsequent wet or dry etching method).

For metals, the structure can be made by wet chemical means using etching processes, by dry process steps such as dry etching, cutting and/or punching processes and/or by dry patterning using impression the impressed points being removed with a knife and/or being able to be filled with another material.

Conversely, it is also possible to put an already patterned electrically conductive layer onto the support, however, as is possible by means of printing (e.g. conductive pastes, conductive silver, organically based materials) or bonding/lamination (e.g. aluminum, copper, silver), for example. The electrically conductive layer can also be put on in patterned form by vapor deposition and/or sputtering. Other methods are lamination, electroplating, spraying, dunking, blade coating and/or printing.

In this case, the electrically conductive layer is patterned/interrupted such that, although the electric power is interrupted, the external package and particularly the foil used as support are patterned as an entire still mechanical layer or a portion thereof, and the support is essentially retained. It is not even necessary to cut through the electrically conductive area completely, and only the conductive connection within the area is interrupted during patterning.

The depth of the recess in the structure matches the thickness of the external package's electrically conductive layer. It can make up the entire thickness of the layer or just a portion of the thickness so long as it is ensured that the structure interrupts the conductive contact within the conductive area and/or the resistance within the conductive area is so high that the shielding produced by the conductive area does not adversely affect the use of radio tags.

The width of the structure is arbitrary so long as it interrupts the conductive area. By way of example, the width of the structure is typically a few 10-500 µm. The minimum width is dependent only on the process used (in order to guarantee secure electrical interruption).

The structure does not just remove and/or expel material from the electrically conductive layer, for example, but rather it is also possible to work and/or impress another, for example insulating, material into the electrically conductive layer, so that shielding within the external package is prevented to a sufficient extent. The use of additionally introduced material may turn out to be advantageous particularly for applications in which the freshness preservation effect of the external package, particularly also on the barrier properties of the external package toward air (oxygen and/or moisture), is in the foreground.

The external package can, but does not have to, be visually shaped by the structure, it may also comprise any other layers, both for visual and for functional purposes, with graphical forms of the external package being able to be produced by the structure or supported by the structure or else being put on the external package without disturbance by the structure.

The size of the remaining continuously conductive areas is dependent on the frequency used and on the size of the antennas used. In this context, when inductive coupling is used the size of the antennas used is crucial and when electromagnetic waves are used the frequency is crucial. One practicality found is that for general prevention of shielding the following is true: the smaller the individual areas the better. A preferred maximum size for the still remaining conducting area of the electrically conductive layer for inductive coupling is taken to be approximately half the area of the transmission antenna, and for larger areas the degree of shielding increases "rapidly", as can be seen from FIG. 7 using a real measurement.

The areas patterned in this manner may take any form (image, logo and/or writing) so long as it is ensured that overall no shielding character arises. The structure can attain a wide variety of visual effects, in particular it is also able to be used for marketing purposes, or for brand protection, or theft prevention or other security features. As an alternative or in addition, the structure may also have other technical functional electrical effects, for example antennas for RFID tags can be produced by the structure.

In this context, in accordance with one advantageous refinement, the structure and/or a portion thereof forms an electric component, for example when it is in the form of an antenna (e.g. coil form or interrupted bar form) for RFID tags and/or other radio tags. In this context, the tag is also situated directly on the portion of the external package with the structure, for example.

It is naturally also possible to produce other electric components using the structure, such as capacitors. For this, however, conductive layers are required on both sides of the external package's support. Similarly, it is also possible to produce resistive tracks by means of a suitable form for the conductor tracks.

By way of example, one portion (normally the largest portion) of the overall external package is patterned and altered using methods as discussed, so that it no longer shields and/or reflects electromagnetic radiation, and at least one other portion of the external package is patterned and altered such that this structure can be used as an antenna for an RFID tag or radio tag or for other purposes, For example.

The typically used external packages for groceries, cigarettes, tobacco in general, chewing gum, chocolates, butter, margarine, cheese, etc. comprise paper or another support, for example including a polymer film (PET, PES, PEN, polyimide, etc.), as the support material with an electrically conductive layer laminated thereon. The possible materials for producing the electrically conductive layer include all metals (e.g. aluminum, copper, silver, gold, chromium, titanium, tin, zinc, iron, etc. and any alloys), conductive pastes (e.g. conductive silver, CarbonBlack (which are pastes with graphite/carbon black)), conductive organically based materials (e.g. polyaniline, Pedot/Pss, or the like) or organometallic systems (e.g. inks with dissolved metal compounds) or combinations thereof.

The thickness of the support varies and is typically 20-100 g/m^2 in the case of paper, with 30-50 g/m$^2$ being usual, for example. In the case of polymer films, it is possible to use any thicknesses, depending on the type of external package, with 10-50 μm (e.g. PET, PPS or similar materials) being typical, for example. The thickness of the conductive laminated layer is 3 to 50 μm, preferably 5-15 μm (e.g. for aluminum-laminated paper for cigarette packages, for example). This may naturally also vary for the other materials or methods mentioned. It is naturally also possible to put on further layers apart from those mentioned, e.g. a protective lacquer to prevent scratching or as a seal, and also, naturally, colored layers for visual misprinting or else further layers for other purposes.

In this case, particularly the radio tags are in the foreground as the electric component. Examples of these are RFID tags, particularly EPC (Electronic Product Code) tags and/or EAS (Electronic Article Surveillance) tags. These tags are based on nationally or internationally released frequency bands for signal transmission, these typically being: 125-135 kHz, 13.56 MHz, 860-950 MHz or 2.45 GHz. In some cases, other frequency bands may also be used, such as approximately 6-8 MHz for theft prevention tags.

It is naturally also possible to produce other fields of use, e.g. use of remote controls (typically in the region of approximately 20-60 MHz), mobile radio (850-2000 MHz) and radio (LW, SW, VHF or comparable) or satellite radio. It is also possible to design external packaging such that it does not need to be removed in microwave ovens (e.g. for heating meals).

The patterning may also be made such that certain frequency ranges and/or directions of polarization are passed and others are shielded or reflected, e.g. using the size and shape of the conductive areas.

The electric component may also comprise at least one functional layer made of organically based material and/or may generally be associated with polymer electronics or with organic electronics.

The patterned external package can then be fed back into the conventional packaging process.

The invention is explained in more detail below using exemplary embodiments:

Figure 1:
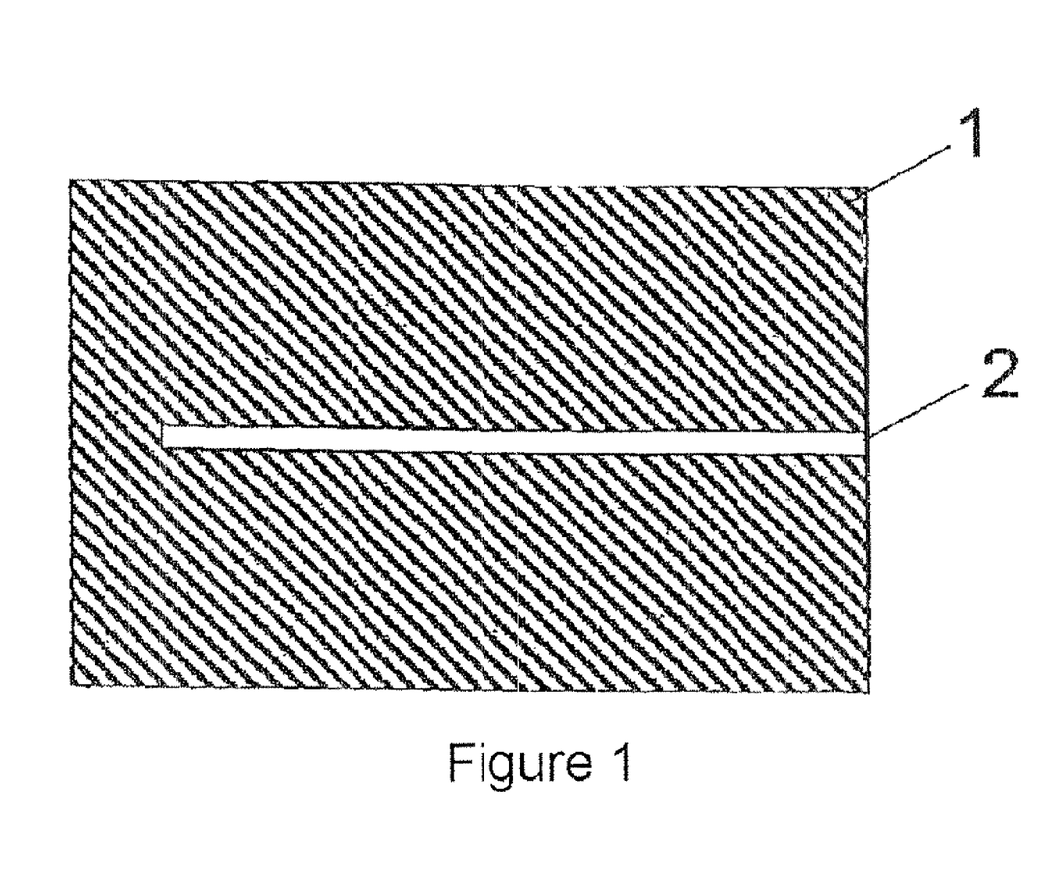
FIG. 1 schematically shows a conductive area in which a structure interrupts the electrically conductive connection within the area.

FIG. 1 shows an external package 1 with a structure 2 on it, it being clearly visible that the structure 2 does not go right through, but extends over more than half of the external package. A structure 2 which goes right through is naturally also covered by the invention.

Figure 2:
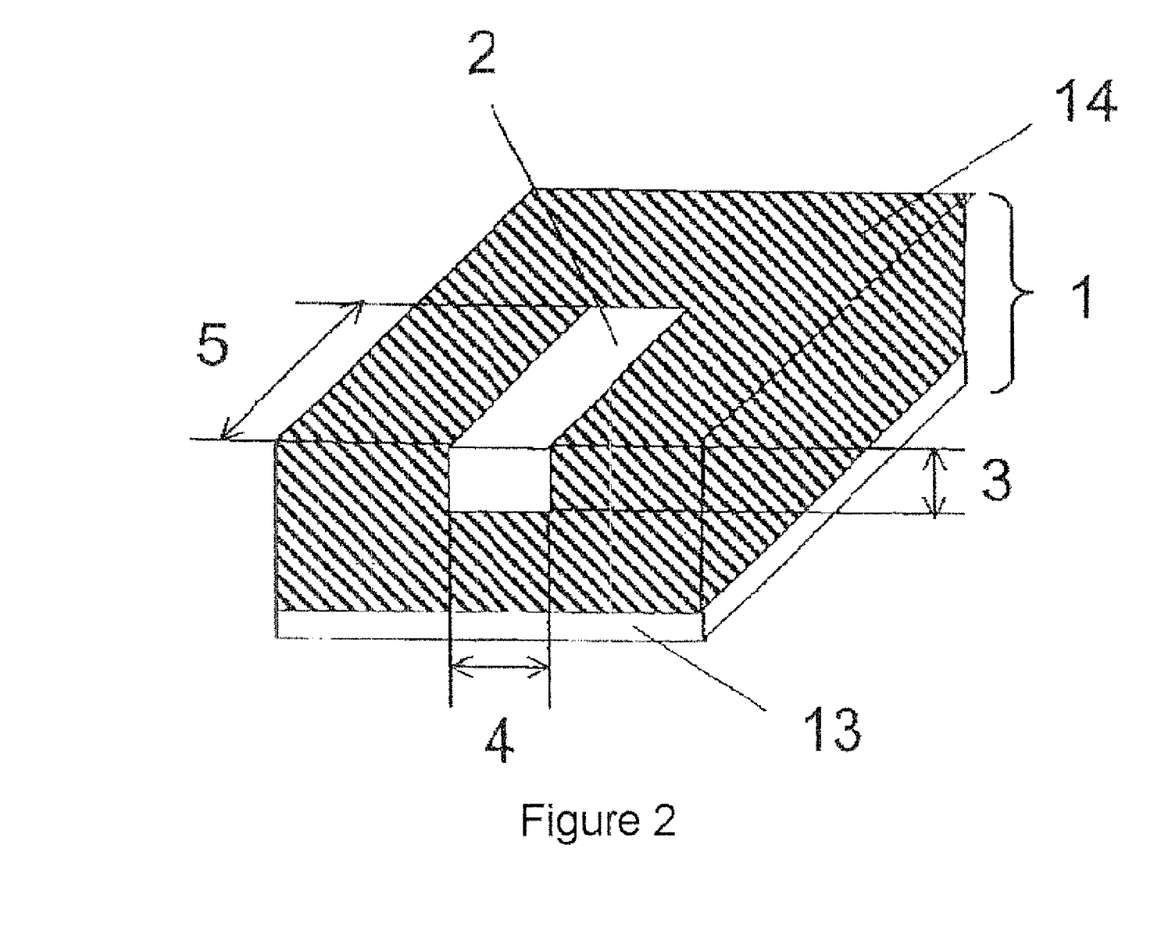
FIG. 2 shows the same patterned conductive area, with the dimensions of the structure being able to be seen.

FIG. 2 shows the external package 1 in a perspective view on which it is possible to see the support 13 and the electrically conductive layer 14 with the structure 2.

The position of the structure 2 and its dimensions can be seen in FIG. 2. The width 4 of the structure 2 can be chosen freely so long as the electrical conductivity is interrupted by the width 4 of this structure 2. The same applies to the depth 3 of the structure 2 (the depth may also cover the entire conductive layer, for security reasons even right into the support material). Only the length 5 of the structure 2 is related to the coil of the electric component and/or of the radio tag (not shown in FIG. 2) such that it measures at least half of the coil.

Figure 3:
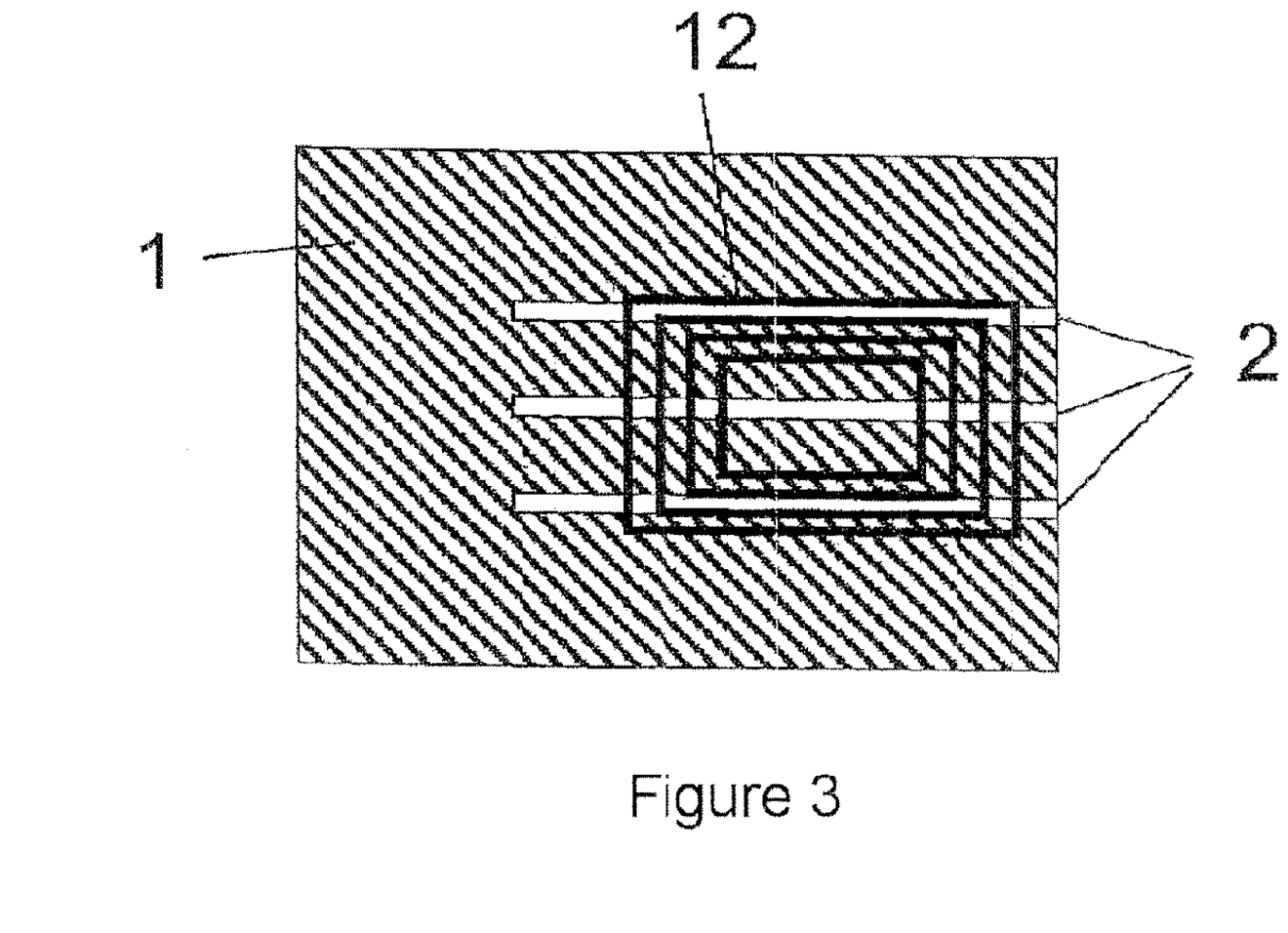
FIGS. 3 and 4 show patterned electrically conductive components in relation to the position of the structure.

FIG. 3 shows the external package 1 with a structure 2 which does not cover the entire length of the electrically conductive area, but the entire length of the antenna 12 (the antenna shown here, merely by way of example and schematically, is a coil for inductive coupling). The form of the antenna may be quite different, depending on the field of use; e.g. in the form of a dipole.

Figure 4:
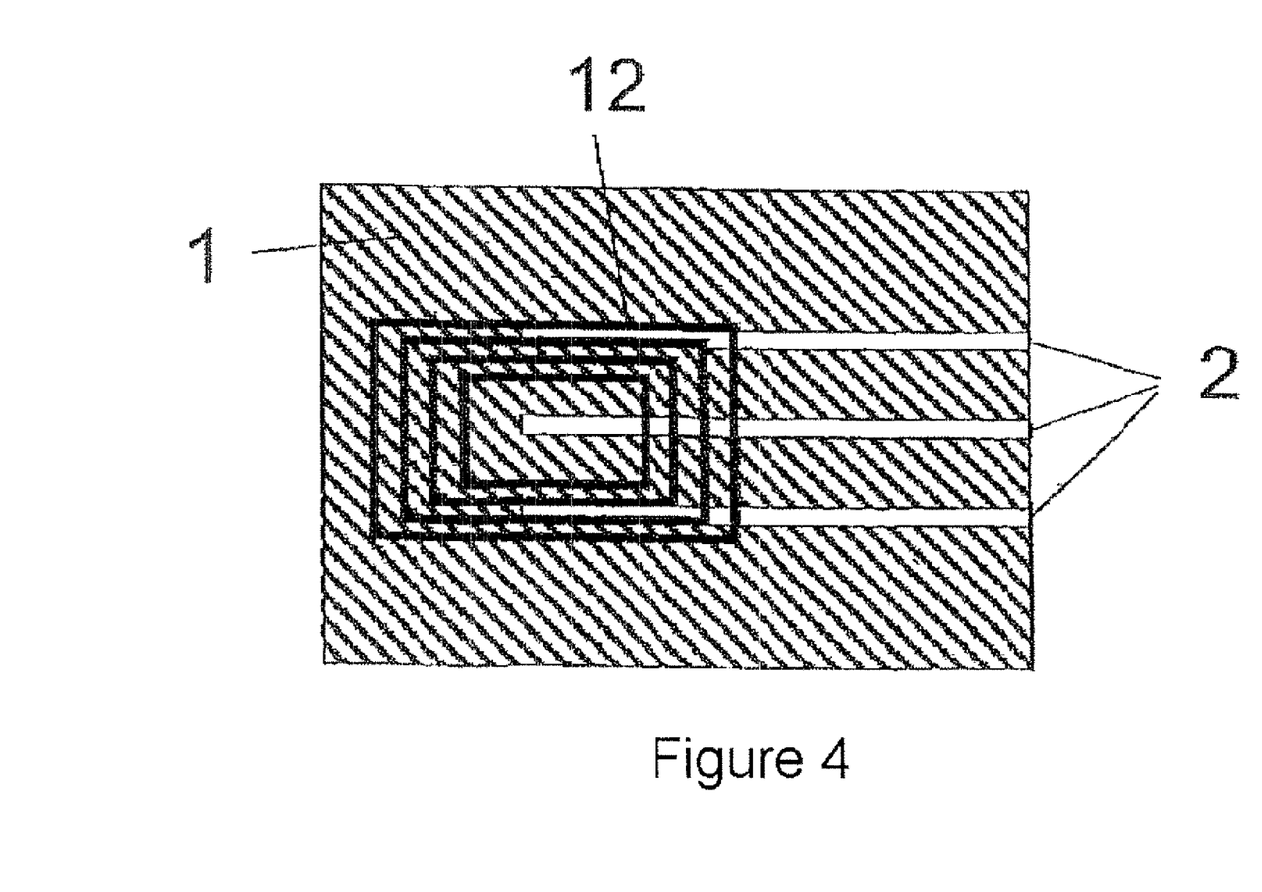

FIG. 4 shows a similar design to that in FIG. 3 with the difference that in this case the structure 2 extends only as far as at least half of the extent of the coil 12. In both cases, shielding by the electrically conductive layer of the external package is prevented to such an extent that the use of radio tags is appropriate, that is to say the component is still operable.

Figure 5:
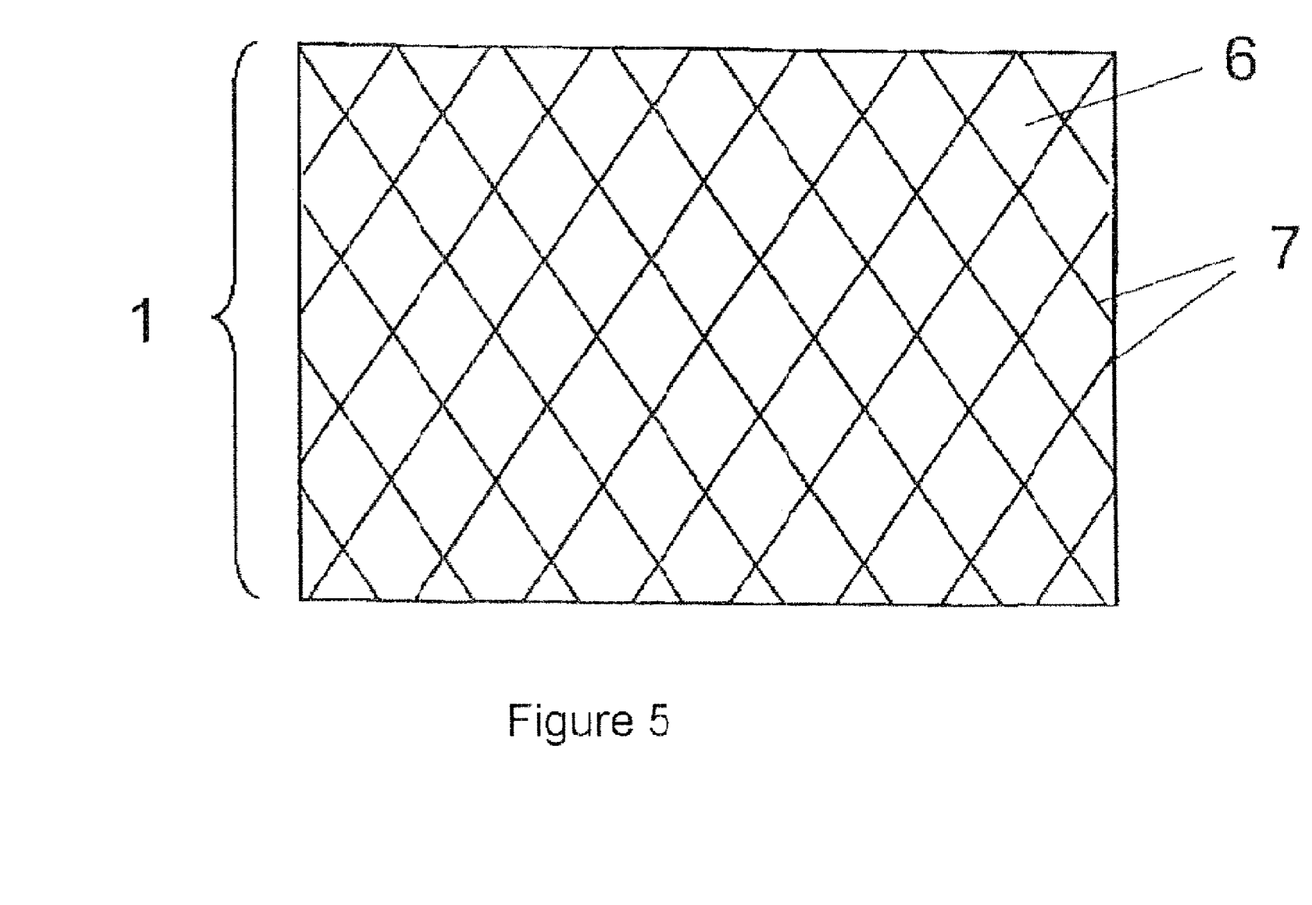
FIG. 5 shows an example of a structure.

FIG. 5 shows an example of a structure which can be put onto the electrically conductive layer of the external package 1 over a large area. It is possible to see a diamond-shaped structure with a large number of parallel and a large number of nonparallel recesses 7 in which the electrically conductive area 6 of the electrically conductive layer of the external package 1 is divided into a large number of small areas. Shielding, which would sensitively disturb the use of radio tags, is effectively prevented by this means because small conductive areas bring about no disturbances in the radio link between the radio tag and the reader. Particularly if the position of the coil within the external package is not clear, it makes sense to put on a large-area structure, as shown here, because the most effective prevention of shielding is achieved by a recess in the electrically conductive area opposite the coil of the electric component, said coil always being automatically covered too with application over a large area.

Figure 6:
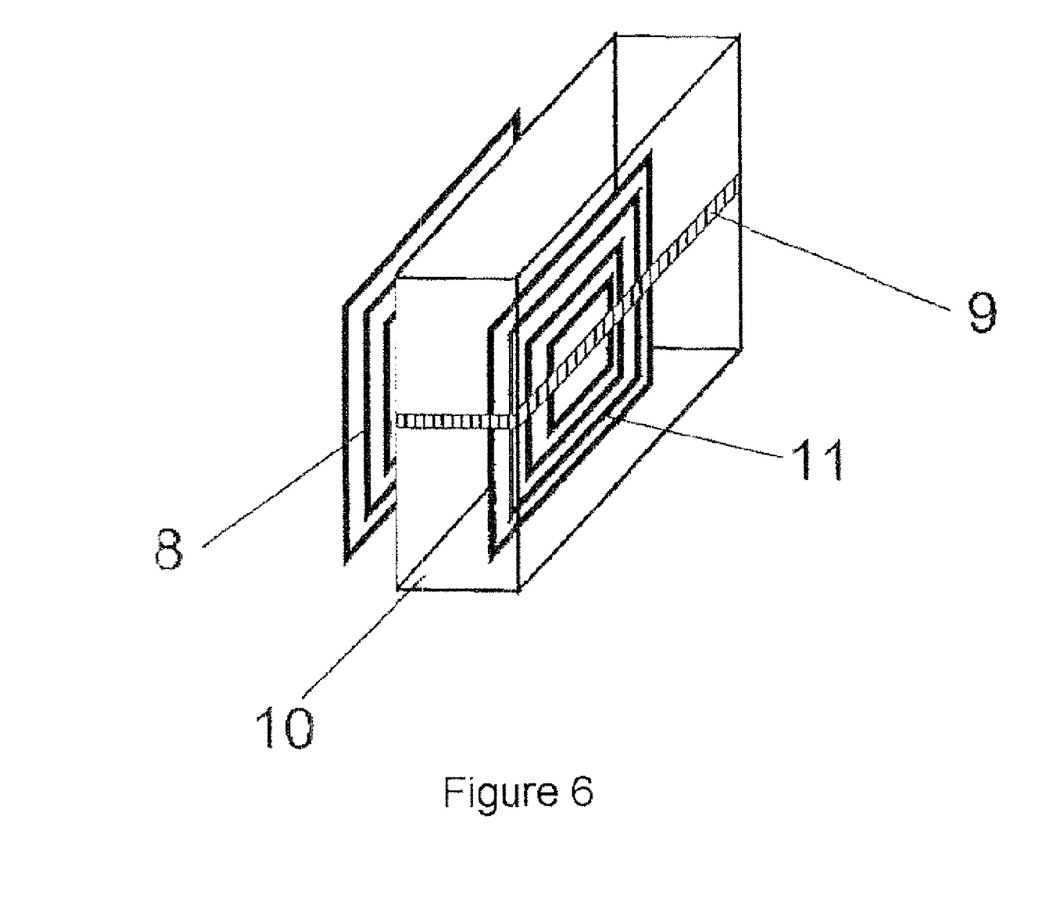
FIG. 6 finally shows an external package with the position shown for the inner coil and on the outside a corresponding coil which corresponds to the coil shown on the inside.

FIG. 6 shows the shielding area (i.e. the external package) in the form of a packet 10. An external transmission antenna 8 is opposite the receiver antenna 11 which is in the packet. On the basis of the prior art, the electromagnetic radiation between the transmission antenna 8 and the receiver antenna 11 is shielded by the packet between them, which has a conductive area in or on it, so that no radio link is set up. However, the structure 9 based on the invention interrupts the conductive area, and it is therefore possible to set up radio contact between the transmitter 8 and the receiver 11. The same naturally also applies if the receiver antenna 11 is not "inside" the packet but rather on and outside the external package but in its surroundings.

The structure 9 shown is just one example and, on the basis of the invention, the structure may naturally take all possible forms, e.g. including the form shown in FIG. 5.

Figure 7:
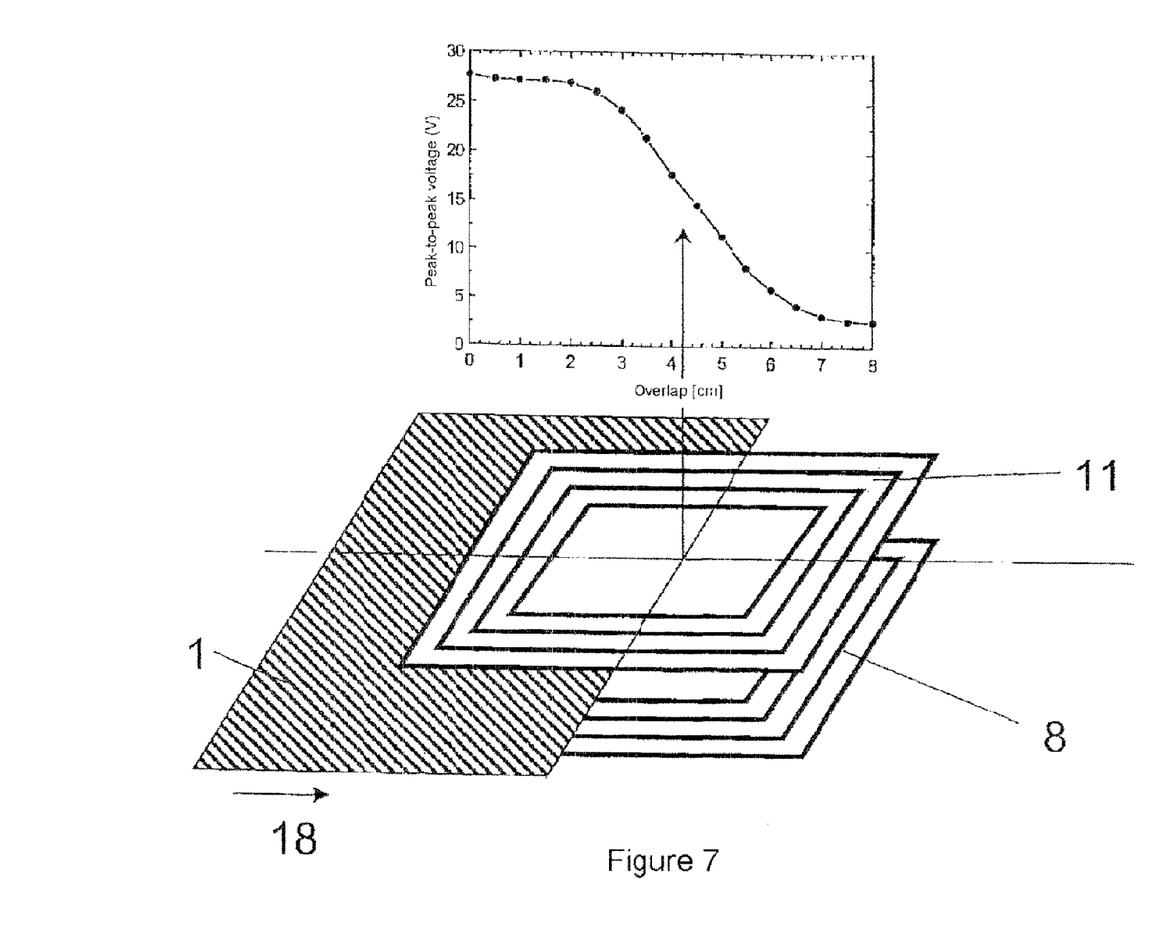
FIG. 7 shows a real measurement for the shielding effect of a conductive layer which is pushed between a transmitter and a receiver antenna.

FIG. 7 shows a measurement of the shielding effect of a conductive layer. Between the transmission antenna 8 and the reception antenna 11, a conductive layer, namely the external package layer 1, is pushed from the left to the right in the direction of the arrow 18. The graph at the top now shows the induced voltage measured at 11 as a function of the overlap by the conductive layer 1. It can clearly be seen that up to an approximately ⅓ overlap the induced voltage remains constant, that is to say there is no shielding effect. With a larger overlap, a rapid drop in the induced voltage then occurs, that is to say that a severe shielding effect occurs. With a complete overlap, it is almost impossible to measure any induced voltage (essentially noise), which indicates a largely full shielding effect. A similar response is also obtained when the transmitter and receiver antennas are situated on one side of the conductive foil and the conductive foil is passed very close to one of the antennas.

The possibly of reducing the shielding by electrically conductive external packages, disclosed here for the first time, allows very simple means and minimum intervention to be used to reduce the unwanted shielding effect of conductive areas to magnetic and electromagnetic fields significantly. It is therefore possible to accommodate radio tags, for example, within or in the surroundings of metallized packages without adversely affecting their operability.

The already publicized intention of many companies to put RFID tags on a large number of products in future is also made possible here for products which are packed in metal foils, metallized and/or metal-laminated paper or foil and/or composite materials which contain metal layers.

The invention claimed is:

1. An external package for a product having an electric component, comprising:
    at least one support and an electrically conductive layer coupled to the support, the external package comprising one of a paper or a polymer film forming the support;
    the electrically conductive layer having an electrically conductive area, the layer comprising a structure and/or a coating arranged to reduce the electrical shielding otherwise exhibited by the conductive area in the surroundings of the external package such that electromagnetic radiation penetrates through the electrically conductive layer, the use of the electric component which delivers or receives information externally through the external package and/or whose power supply is fed through the external package thereby being not adversely affected or thereby is adversely affected only to an extent such that the component remains operable;
    the structure for dividing the conductive area of the electrically conductive layer into at least two electrically isolated areas and being arranged to interrupt the electrically conductive area of the electrically conductive layer at least once;
    the electrical component including a coil adjacent to the conductive layer, the coil having a center, the structure being arranged opposite the coil center, the interruption dividing the conductive area in at least the area adjacent to the coil into two halves.

2. The external package as claimed in claim 1, wherein the structure comprises a recess in the conductive area of the electrically conductive layer.

3. The external package as claimed in claim 1 wherein the structure comprises at least two recesses.

4. The external package as claimed in claim 1 wherein the coating for reducing the shielding comprises a metal layer with a maximum thickness of 1 μm with further layers for completing the external package.

5. The external package as claimed in claim 1 wherein the structure and/or portions of the structure form electric components, comprising at least one of an antenna, a capacitor, a conductor track, and a diode or portions thereof.

6. The external package as claimed in claim 1 wherein the structure at least partly exhibits not only its technical effect of reducing electrical shielding, but also a visual effect, comprising reproducing at least one of an image, a security feature, a lettering, a miscellaneous visual feature and/or a logo.

7. The external package as claimed in claim 1, wherein the surface of the external package is arranged to exhibit an image.

8. The external package as claimed in claim 1 arranged for use in at least one of a cigarette package, a grocery package, a medicine package, a radio, a remote control or a microwave oven.

9. The external package as claimed in claim 1 wherein the support has a thickness of less than or equal to about 50 μm.

10. The external package as claimed in claim 1 wherein the electrically conductive layer has a thickness of less than or equal to about 50 μm.

11. The external package as claimed in claim 1 wherein the structure has a width and a length, the width having a value of up to about 500 μm.

12. The external package as claimed in claim 1 wherein the external package has a side of a given extent, the structure extending over more than half of the given extent of the side of the external package.

* * * * *